United States Patent
He et al.

(10) Patent No.: US 12,240,775 B2
(45) Date of Patent: Mar. 4, 2025

(54) CORE-SHELL STRUCTURE MEMBRANE SCALE INHIBITOR AND PREPARATION METHOD THEREFOR

(71) Applicant: JIANGSU FEYMER TECHNOLOGY CO., LTD., Zhangjiagng (CN)

(72) Inventors: Guofeng He, Zhangjiagng (CN); Zhuqing Liu, Zhangjiagng (CN); Qin Wang, Zhangjiagng (CN)

(73) Assignee: JIANGSU FEYMER TECHNOLOGY CO., LTD., Zhangjiagng (CN)

( * ) Notice: Subject to any disclaimer, the term of this patent is extended or adjusted under 35 U.S.C. 154(b) by 237 days.

(21) Appl. No.: 18/000,961

(22) PCT Filed: Jun. 2, 2021

(86) PCT No.: PCT/CN2021/097798
§ 371 (c)(1),
(2) Date: Dec. 7, 2022

(87) PCT Pub. No.: WO2021/259023
PCT Pub. Date: Dec. 30, 2021

(65) Prior Publication Data
US 2023/0212048 A1 Jul. 6, 2023

(30) Foreign Application Priority Data
Jun. 23, 2020 (CN) .......................... 202010581814.4

(51) Int. Cl.
| C08F 2/24 | (2006.01) |
|---|---|
| B01D 65/08 | (2006.01) |
| C02F 5/10 | (2023.01) |
| C08F 257/02 | (2006.01) |
| C08F 265/06 | (2006.01) |
| C08J 3/00 | (2006.01) |
| C08J 3/12 | (2006.01) |

(52) U.S. Cl.
CPC .............. *C02F 5/10* (2013.01); *B01D 65/08* (2013.01); *C08F 257/02* (2013.01); *C08F 265/06* (2013.01); *C08J 3/126* (2013.01); C08J 2325/06 (2013.01); C08J 2333/12 (2013.01); *C08J 2433/02* (2013.01); *C08J 2433/26* (2013.01); *C08J 2435/02* (2013.01)

(58) Field of Classification Search
CPC .......... C02F 5/10; B01D 65/08; C08F 257/02; C08F 265/06; C08F 250/00; C08F 2/22; C08J 3/126; C08J 2325/06; C08J 2333/12; C08J 2433/02; C08J 2433/26; C08J 2435/02; C08J 3/00; C08J 3/02; C09F 2/24

See application file for complete search history.

(56) References Cited

FOREIGN PATENT DOCUMENTS

| CN | 101423299 B | 11/2012 | |
|---|---|---|---|
| CN | 102399018 B | 7/2013 | |
| CN | 103191646 B | 8/2015 | |
| CN | 106977654 A | * 7/2017 | ............... C08F 2/26 |
| CN | 108367252 A | 8/2018 | |

OTHER PUBLICATIONS

Synthesis of Spherical Polyelectrolyte Brushes by Photoemulsion Polymerization, Guo et al. Macromolecules, vol. 32, No. 19, 1999.*
CN-106977654-A translation (Year: 2024).*

* cited by examiner

*Primary Examiner* — Haidung D Nguyen
(74) *Attorney, Agent, or Firm* — ALBERT BORDAS P.A.

(57) ABSTRACT

Disclosed are a core-shell structure membrane scale inhibitor and a preparation method therefor, wherein the core-shell structure membrane scale inhibitor has a core emulsion obtained via emulsion polymerization, and a shell structure obtained via ultraviolet-light grafting functional monomers. The preparation method has first preparing a core by using an emulsion polymerization process, adding a reactive photo-initiator in the later stage of polymerization, so that the reactive photo-initiator is grafted on the surface of the core, and finally initiating the polymerization of functional monomers by means of ultraviolet light to obtain a core-shell structure membrane scale inhibitor. The surface structure of the core is modified, such that a large number of ionizable groups are grafted on the surface thereof, and thus, a large number of scaling ions such as $Ca^{2+}$, $Mg^{2+}$ and $Al^{3+}$ can be adsorbed.

5 Claims, 1 Drawing Sheet

Time (days)

Time (days)

CORE-SHELL STRUCTURE MEMBRANE SCALE INHIBITOR AND PREPARATION METHOD THEREFOR

BACKGROUND OF THE INVENTION

1. Field of the Invention

The invention relates to a core-shell structure membrane scale inhibitor and a preparation method therefor.

2. Description of the Related Art

As the issue of water shortage has become a major environmental concern, and public awareness of environmental protection has improved over the past years, membrane techniques have been widely used in water treatments such as municipal, electric power, papermaking, environmental protection and domestic water. Membrane scaling is one of the major issues affecting its normal operation. When scale is deposited on a surface of the membrane, working efficiency of the membrane permeation system is reduced, and the service life of the membrane and its equipment is shortened. Therefore, it is necessary to disable the equipment for chemical cleaning or for replacement of membrane parts, which requires heavy workload and increases costs. A membrane scale inhibitor is a high-efficiency scale inhibitor specifically developed for reverse osmosis systems, nanofiltration membrane systems, ultrafiltration membrane systems and microfiltration membrane systems. Such a scale inhibitor is used to reduce the deterioration of membrane permeability, due to scale and deposits accumulated on membrane surfaces, by means of lattice distortion and dispersion effect, and it helps to solve problems of reduced permeability and increased energy consumption.

The membrane scale inhibitors can be classified as polyphosphates, organic phosphates, organophosphates and polymers. A scale inhibition mechanism of polyphosphate scale inhibitors is to adsorb on active sites on a surface of a crystal (crystal nucleus) through some functional groups in molecules or the electrostatic force, so that crystal growth slows down and many crystals can be kept in a crystalline state for increasing their solubility; organic phosphate scale inhibitors prevent scale formation by slowing down the crystal growth and the lattice distortion. By contrast, organophosphates have poor scale inhibition effects on calcium carbonate scale, so use of the organophosphates in reverse osmosis systems have poor effects. Polymer scale inhibitors are selected from the group consisting essentially of polyacrylic acid, hydrolyzed maleic anhydride, maleic anhydride-acrylic acid copolymers, acrylic acid-methacrylate copolymers, phosphorus carboxylic acid copolymers, and sulfonic acid-based polycarboxylic acid. Physical and chemical adsorption will occur when anionic groups in this type of scale inhibitors collide with the scaling ions, and surfaces of the scaling ions will form an electric double layer and be negatively charged. Since a chain structure of the scale inhibitor can absorb a large number of scaling ions with the same charge, electrostatic repulsion can prevent the scaling ions from colliding with each other, thereby avoiding the formation of large crystals. When adsorption products encounter other scale inhibitor molecules, the adsorbed crystals are transferred, and crystal particles are uniformly dispersed.

A technical solution provided in Chinese patent document CN102399018B is implemented by using dendrimers, acrylic acid/acrylamide copolymers, organic phosphonic acid or an organic carboxylic acid polymers for scale inhibition.

A technical solution provided in Chinese patent document CN103191646B is implemented by using sulfonate copolymers, polyepoxysuccinic acid, polyaspartic acid, benzisothiazolinone, deionized water and other substances for descaling.

A technical solution provided in Chinese patent document CN101423299B is implemented by compounding acrylic acid, methyl acrylate and propylene sulfonic acid terpolymers, phosphorus carboxylic acid scale inhibitors, and organic phosphoric acid scale inhibitors for scale inhibition.

A technical solution provided in Chinese patent document CN108367252A is implemented by compounding A component (terpolymers of maleic acid, alkyl acrylate and vinyl acetate) and B component (homopolymer of carboxylic acid) for scale inhibition.

In the above-mentioned patents, the scale inhibitors with a linear or branched structure generally have a few anionic groups, and the ability to absorb the scaling ions is weak, so it is impossible for them to effectively inhibit scale; in addition, after they are compounded with other types of scale inhibitors, they have disadvantages of low scale inhibition efficiency and large dosage.

SUMMARY OF THE INVENTION

An object of the invention is to solve the technical problems in the prior art, and the present invention provides a core-shell structure membrane scale inhibitor and a preparation method therefor.

A first technical solution for achieving the object of the invention: a preparation method for a core-shell structure membrane scale inhibitor, comprising the steps of:

Step 1, adding a core monomer, emulsifier and an initiator to deionized water to obtain a solution, introducing nitrogen into and removing oxygen from the solution, and performing a polymerization process on the solution to obtain a pre-emulsion;

Step 2, adding a reactive photo-initiator to the pre-emulsion obtained in Step 1, and mixing them well to obtain a core emulsion; and Step 3, dissolving the core emulsion and functional monomers in deionized water to obtain a solution, adding the solution to an ultraviolet-light reactor, and introducing nitrogen into and removing oxygen from the solution, and performing a polymerization process on the solution to obtain a membrane scale inhibitor.

The core monomer is selected from the group consisting of styrene, methyl styrene, methyl methacrylate, methyl acrylate, butyl acrylate, or combinations thereof.

A mass of the core monomer accounts for 1-10% of the total mass of the core emulsion.

The emulsifier is selected from the group consisting of sodium dodecyl sulfonate, sodium dodecyl benzene sulfonate, sodium dodecyl sulfate, or combinations thereof.

A mass of the emulsifier accounts for 0.01-0.2% of the total mass of the core emulsion.

The initiator is selected from the group consisting of azobisisobutyronitrile, potassium persulfate, ammonium persulfate, tert-butyl hydroperoxide, or combinations thereof.

A mass of the initiator accounts for 0.1-1% of the total mass of the core emulsion.

In Step 1, The polymerization process is carried out at a temperature between 60° C. to 100° C., preferably between 75° C. to 85° C., for 2-3 hours.

In Step 3, The polymerization process is carried out at a temperature between 60° C. to 100° C., preferably between 75° C. to 85° C., for 2-3 hours.

A method for preparing the reactive photo-initiator comprises: dissolving a photo-initiator and reactive monomers in acetone to obtain a mixture, allowing the mixture to be subjected to a polymerization process at an ice bath for 12 hours to obtain the reactive photo-initiator.

A mass of the reactive photo-initiator accounts for 0.05-0.5% of the total mass of the core emulsion.

The photo-initiator is selected from the group consisting of 2-hydroxy-2-methyl-1-phenylacetone, hydroxycyclohexylphenyl ketone, 2-methyl-2-(4-morpholinyl)-1-[4-(methylthio) phenyl]-1-acetone, 2-dimethylamino-2-benzyl-1-[4-(4-morpholinyl) phenyl]-1-butanone, 2-hydroxy-2-methyl-1-[4-(2-hydroxyethoxy) phenyl]-1-acetone, or combinations thereof.

A mass of the photo-initiator accounts for 60-70% of the total mass of the reactive photo-initiator.

The reactive monomer is selected from the group consisting of vinyl phosphonoyl chloride, 2-butenoyl chloride, acryloyl chloride and methacryloyl chloride, or combinations thereof.

A mass of the reactive monomer accounts for 30-40% of the total mass of the reactive photo-initiator.

A mass of the core emulsion accounts for 10-70%, preferably 20-50% of the total mass of the membrane scale inhibitor.

The functional monomer is selected from the group consisting of acrylic acid, methacrylic acid, sodium styrenesulfonate, maleic acid, and 2-acrylamide-2-methylpropanesulfonic acid, or combinations thereof.

A mass of the functional monomer accounts for 0.1-1% of the total mass of the membrane scale inhibitor.

The ultraviolet-light reactor uses an ultraviolet light having a wavelength of 205-395 nm, preferably 365 nm.

A second technical solution for achieving the object of the invention: a core-shell structure membrane scale inhibitor, obtained by the above-mentioned preparation method for a core-shell structure membrane scale inhibitor, comprises a core emulsion obtained via emulsion polymerization, and a shell structure obtained via ultraviolet-light grafting functional monomers.

By adopting the above-mentioned technical solutions, the present invention has the beneficial effects that a surface structure of the core is modified, a core is prepared via emulsion polymerization, and a reactive photo-initiator is added in the later stage of polymerization, so that more grafting points can be formed thereon, and finally, polymer chains with a large number of ionizable groups are grafted on the surface thereof by initiating the polymerization of functional monomers by means of ultraviolet light to obtain a core-shell structure membrane scale inhibitor. The core-shell structure has a thickness of up to tens to hundreds of nanometers, and thus, a large number of scaling ions such as $Ca^{2+}$, $Mg^{2+}$ and $Al^{3+}$ can be adsorbed. The present invention has high absorption efficiency and excellent scale inhibition performance, and can be widely used in the field of scale inhibition of membrane systems in water treatments such as municipal, electric power, papermaking, environmental protection and domestic water, for example, it is used in the field of scale inhibition of reverse osmosis membranes, nanofiltration membranes, ultrafilteration membranes and microfiltration membranes etc.

BRIEF DESCRIPTION OF THE DRAWINGS

The accompanying drawings, together with the specification, illustrate exemplary embodiments of the present disclosure, and, together with the description, serve to explain the principles of the present invention.

DETAILED DESCRIPTION

Figure 1:
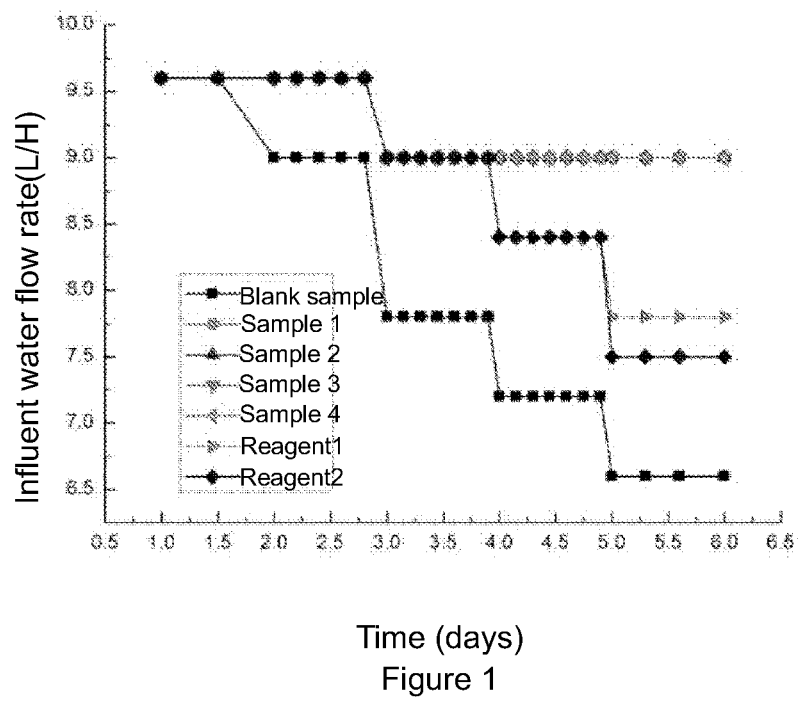
FIG. 1 is a graph showing influent water flow rate of $CaCO_3$ scale inhibition by each scale inhibitor in an embodiment of the present invention.

The technical solution of the present invention will now be described clearly and fully hereinafter with reference to the embodiments of the present invention for helping those skilled in the art to better understand the technical solution of the invention.

A core-shell structure membrane scale inhibitor in this example comprises a core emulsion obtained via emulsion polymerization, and a shell structure obtained via ultraviolet-light grafting functional monomers. The preparation method comprises: first adding a core monomer, emulsifier and an initiator to deionized water to obtain a solution, introducing nitrogen into and removing oxygen from the solution, and performing a polymerization process on the solution at a certain temperature for 2-3 hours to obtain a pre-emulsion; then adding a reactive photo-initiator to the pre-emulsion obtained in Step 1, and mixing them well to obtain a core emulsion; and finally dissolving the core emulsion and functional monomers in deionized water to obtain a solution, adding the solution to an ultraviolet-light reactor, and introducing nitrogen into and removing oxygen from the solution, and performing a polymerization process on the solution for 2-3 hours to obtain a membrane scale inhibitor.

The core monomer is selected from the group consisting of styrene, methyl styrene, methyl methacrylate, methyl acrylate, butyl acrylate, or combinations thereof, and a mass of the core monomer accounts for 1-10% of the total mass of the core emulsion. The emulsifier is selected from the group consisting of sodium dodecyl sulfonate, sodium dodecyl benzene sulfonate, sodium dodecyl sulfate, or combinations thereof, and a mass of the emulsifier accounts for 0.01-0.2% of the total mass of the core emulsion. The initiator is selected from the group consisting of azobisisobutyronitrile, potassium persulfate, ammonium persulfate, tert-butyl hydroperoxide, or combinations thereof, and a mass of the initiator accounts for 0.1-1% of the total mass of the core emulsion. The polymerization process is carried out at a temperature between 60° C. to 100° C., preferably between 75° C. to 85° C. A mass of the core emulsion accounts for 10-70%, preferably 20-50% of the total mass of the membrane scale inhibitor. The functional monomer is selected from the group consisting of acrylic acid, methacrylic acid, sodium styrenesulfonate, maleic acid, and 2-acrylamide-2-methylpropanesulfonic acid, or combinations thereof, and a mass of the functional monomer accounts for 0.1-1% of the total mass of the membrane scale inhibitor. The ultraviolet light has a wavelength of 205-395 nm, preferably 365 nm.

A preparation method for the reactive photo-initiator comprises the steps of dissolving a photo-initiator and reactive monomers in acetone to obtain a mixture, allowing the mixture to be subjected to a polymerization process at an ice bath for 12 hours to obtain the reactive photo-initiator, wherein a mass of the reactive photo-initiator accounts for 0.05-0.5% of the total mass of the core emulsion.

The photo-initiator is selected from the group consisting of 2-hydroxy-2-methyl-1-phenylacetone, hydroxycyclohexylphenyl ketone, 2-methyl-2-(4-morpholinyl)-1-[4-(methylthio) phenyl]-1-acetone, 2-dimethylamino-2-benzyl-1-[4-(4-morpholinyl) phenyl]-1-butanone, 2-hydroxy-2-methyl-1-[4-(2-hydroxyethoxy) phenyl]-1-acetone, or combinations thereof, and a mass of the photo-initiator accounts for 60-70% of the total mass of the reactive photo-initiator. The reactive monomer is selected from the group consisting of vinyl phosphonoyl chloride, 2-butenoyl chloride, acryloyl chloride and methacryloyl chloride, or combinations thereof, and a mass of the reactive monomer accounts for 30-40% of the total mass of the reactive photo-initiator.

Four samples were prepared by using the above-mentioned methods:

Sample 1: 12 g of styrene, 0.25 g of sodium dodecyl sulfonate, 0.75 g of potassium persulfate and 287 g of deionized water were added to a four-necked flask with 500 ml volume, nitrogen was introduced into and the oxygen was removed from the flask, it was heated at 80° C. for two hours, and then 1.5 g of a reactive photo-initiator was added therein, and a polymerization process was carried out for 2 hours to obtain a core emulsion. 150 g of the core emulsion, 5 g of acrylic acid and 345 g of deionized water were transferred into a photo-reactor, nitrogen was introduced into and oxygen was removed from the photo-reactor, and finally the polymerization process was carried out for 3 hours to obtain the sample 1.

Sample 2: 15 g of methyl methacrylate, 0.3 g of sodium dodecyl benzene sulfonate, 0.75 g of azodiisobutyronitrile and 284 g of deionized water were added to a four-necked flask with 500 ml volume, nitrogen was introduced into and the oxygen was removed from the flask, it was heated at 80° C. for two hours, and then 2 g of a reactive photo-initiator was added therein, and a polymerization process was carried out for 2 hours to obtain a core emulsion. 150 g of the core emulsion, 5 g of 2-acrylamide-2-methylpropanesulfonic acid and 345 g of deionized water were transferred into a photo-reactor, nitrogen was introduced into and oxygen was removed from the photo-reactor, and finally the polymerization process was carried out for 3 hours to obtain the sample 2.

Sample 3: 12 g of styrene, 0.25 g of sodium dodecyl benzene sulfonate, 0.75 g of ammonium persulfate and 287 g of deionized water were added to a four-necked flask with 500 ml volume, nitrogen was introduced into and the oxygen was removed from the flask, it was heated at 80° C. for two hours, and then 1.5 g of a reactive photo-initiator was added therein, and a polymerization process was carried out for 2 hours to obtain a core emulsion. 150 g of the core emulsion, 5 g of methacrylic acid and 345 g of deionized water were transferred into a photo-reactor, nitrogen was introduced into and oxygen was removed from the photo-reactor, and finally the polymerization process was carried out for 3 hours to obtain the sample 3.

Sample 4: 60 g of styrene, 1.5 g of sodium dodecyl sulfate, 4 g of ammonium persulfate and 1434.5 g of deionized water were added to a four-necked flask with 2000 ml volume, nitrogen was introduced into and the oxygen was removed from the flask, it was heated at 80° C. for two hours, and then 15 g of a reactive photo-initiator was added therein, and a polymerization process was carried out for 2 hours to obtain a core emulsion. 150 g of the core emulsion, 5 g of maleic acid and 345 g of deionized water were transferred into a photo-reactor, nitrogen was introduced into and oxygen was removed from the photo-reactor, and finally the polymerization process was carried out for 3 hours to obtain the sample 4.

The above-mentioned four samples, commonly used reagents in the market (ASD 200, MDC754) and blank samples were evaluated for scale inhibition.

Experimental water was prepared first, and water parameters required for inhibition of calcium carbonate are shown in Table 1.

TABLE 1

Water quality performance for inhibition of calcium carbonate

| pH | Electrical conductivity (us/cm) | Calcium hardness ppm | Total Alkalinity ppm | Langelier Index |
|---|---|---|---|---|
| 8.6 | 2974 | 571 | 588 | 2.23 |

Figure 2:
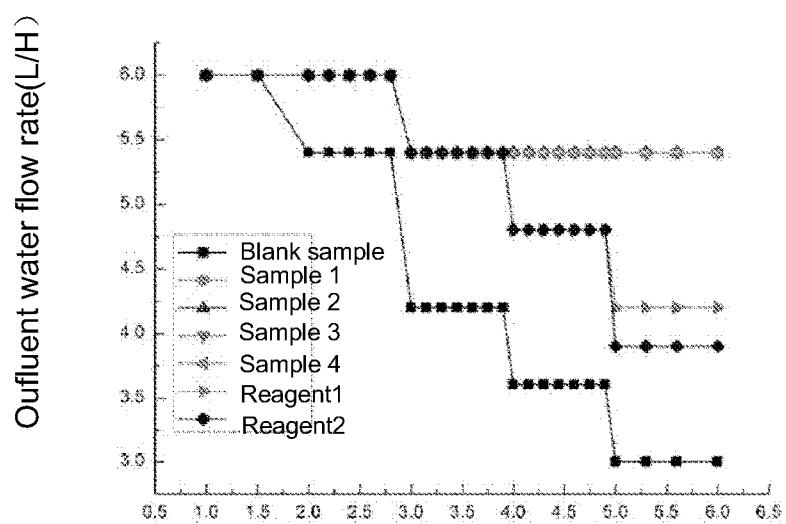
FIG. 2 is a graph showing outfluent water flow rate of $CaCO_3$ scale inhibition by each scale inhibitor in an embodiment of the present invention.

Then the above four samples, the reagent 1 (ASD 200), the reagent 2 (MDC 754) and the blank samples were diluted 11000 times. Then the above four samples, the reagent 1, the reagent 2 and the blank samples, which are diluted by 5 ppm, were added to the prepared experimental water, respectively, lasting for 1 week for observation of the experiment. The experimental results are as follows:

FIG. 1 shows influent water flow rate of $CaCO_3$ scale inhibition by each scale inhibitor. FIG. 2 shows outfluent water flow rate of $CaCO_3$ scale inhibition by each scale inhibitor. The weight gain data of each scale inhibitor membrane are shown in Table 2.

TABLE 2

Weight gain data of each scale inhibitor membrane

| Name | Before experiment (g) | After experiment (g) | Weight gain (g) |
|---|---|---|---|
| Blank sample | 204.32 | 268.74 | 64.42 |
| Sample 1 | 207.98 | 232.77 | 24.79 |
| Sample 2 | 204.66 | 228.50 | 23.84 |
| Sample 3 | 207.33 | 234.91 | 27.58 |
| Sample 4 | 206.33 | 230.13 | 23.80 |
| Reagent 1 | 204.19 | 238.72 | 34.53 |
| Reagent 2 | 203.77 | 241.34 | 37.57 |

Through the above experimental results, it proves that the influent water flow rate and the outfluent water flow rate of the core-shell structure membrane scale inhibitor in this example are higher than those of commonly used reagents in the market, indicating that the core-shell structure membrane scale inhibitor can maintain the permeation of influent water flow and outfluent water flow, so as to ensure a normal operation of the membrane permeation system, thus, the scale inhibition efficiency is higher; it can be known from the analysis of the membrane weight gain data that the membrane weight gain of the core-shell structure membrane scale inhibitor in this example is much lower than that of the commonly used reagents in the market, since the core structure is modified, so that a large number of ionizable groups are grafted on the surface thereof, and thus, a large number of scaling ions can be adsorbed. The present invention has excellent scale inhibition performance, and can be widely used in the field of scale inhibition of membrane systems in water treatments such as municipal, electric power, papermaking, environmental protection and domestic water, for example, it is used in the field of scale inhibition of reverse osmosis membranes, nanofiltration membranes, ultrafilteration membranes and microfiltration membranes etc.

The above descriptions are only the preferred embodiments of the invention, not thus limiting the embodiments and scope of the invention. Those skilled in the art should be able to realize that the schemes obtained from the content of specification and drawings of the invention are within the scope of the invention.

What is claimed is:

1. A preparation method for a core-shell structure membrane scale inhibitor, comprising the steps of:
    Step 1, adding a core monomer, emulsifier and an initiator to deionized water to obtain a solution, introducing nitrogen into and removing oxygen from the solution, and performing a polymerization process on the solution to obtain a pre-emulsion;
    Step 2, adding a reactive photo-initiator to the pre-emulsion obtained in step A, and mixing them well to obtain a core emulsion; and
    Step 3, dissolving the core emulsion and functional monomers in deionized water to obtain a solution, adding the solution to an ultraviolet-light reactor, and introducing nitrogen into and removing oxygen from the solution, and performing a polymerization process on the solution to obtain a membrane scale inhibitor, wherein the core monomer is selected from the group consisting of styrene, methyl styrene, methyl methacrylate, methyl acrylate, butyl acrylate, or combinations thereof, wherein the emulsifier is selected from the group consisting of sodium dodecyl sulfonate, sodium dodecyl benzene sulfonate, sodium dodecyl sulfate, or combinations thereof, wherein the initiator is selected from the group consisting of azobisisobutyronitrile, potassium persulfate, ammonium persulfate, tert-butyl hydroperoxide, or combinations thereof, wherein the functional monomer is selected from the group consisting of acrylic acid, methacrylic acid, sodium styrenesulfonate, maleic acid, and 2-acrylamide-2-methyl-propanesulfonic acid, or combinations thereof.

2. The preparation method for a core-shell structure membrane scale inhibitor of claim 1, wherein a method for preparing the reactive photo-initiator comprises: dissolving a photo-initiator and reactive monomers in acetone to obtain a mixture, allowing the mixture to be subjected to a polymerization process at an ice bath for 12 hours to obtain the reactive photo-initiator.

3. The preparation method for a core-shell structure membrane scale inhibitor of claim 2, wherein the photo-initiator is selected from the group consisting of 2-hydroxy-2-methyl-1-phenylacetone, hydroxycyclohexylphenyl ketone, 2-methyl-2-(4-morpholinyl)-1-[4-(methylthio) phenyl]-1-acetone, 2-dimethylamino-2-benzyl-1-[4-(4-morpholinyl) phenyl]-1-butanone, 2-hydroxy-2-methyl-1-[4-(2-hydroxyethoxy) phenyl]-1-acetone, or combinations thereof.

4. The preparation method for a core-shell structure membrane scale inhibitor of claim 2, wherein the reactive monomer is selected from the group consisting of vinyl phosphonoyl chloride, 2-butenoyl chloride, acryloyl chloride and methacryloyl chloride, or combinations thereof.

5. The preparation method for a core-shell structure membrane scale inhibitor of claim 1, wherein the ultraviolet-light reactor uses an ultraviolet light having a wavelength of 205-395 nm.

* * * * *